April 12, 1960     W. H. JACOBS     2,932,493
BEVERAGE MIXER
Filed Sept. 9, 1957
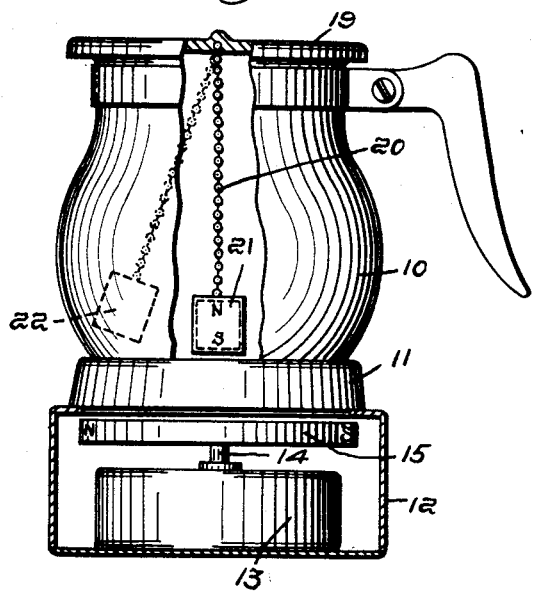
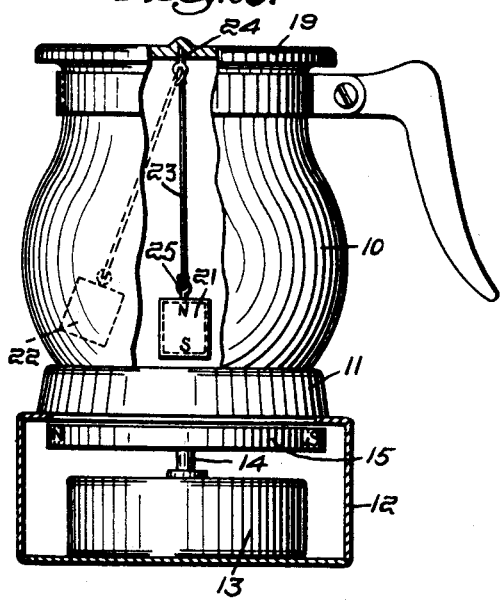
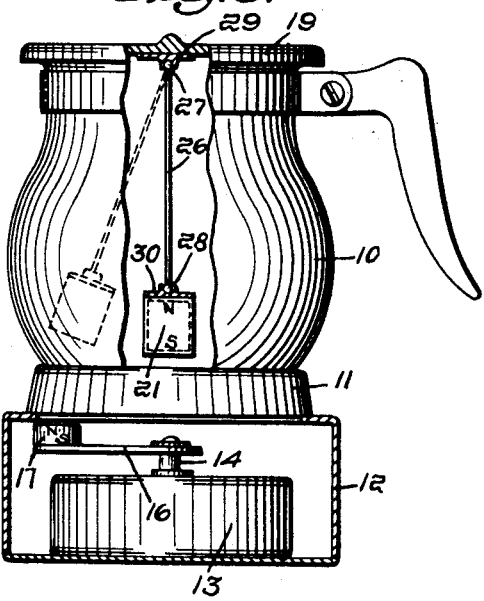
Inventor:
William H. Jacobs,
by Arthur D Thomson
Attorney United States Patent Office 2,932,493
Patented Apr. 12, 1960

2,932,493

BEVERAGE MIXER

William H. Jacobs, Newton, Mass., assignor to Magic Whirl Dispensers, Inc., Boston, Mass., a corporation of Massachusetts Application September 9, 1957, Serial No. 682,810

3 Claims. (Cl. 259—102)

This invention relates to beverage mixing devices of the kind used in soda fountains and restaurants to mix beverages made from powders or concentrates, for example hot chocolate.

The general object of the invention is to provide a mixer which will mix a beverage quickly and thoroughly, preferably at high enough speed to produce a certain amount of aeration when desired, which eliminates the danger of contamination of the beverage by oil from the drive motor, and in which all parts which come in contact with the beverage are easily accessible for cleaning and sterilizing.

In the drawings illustrating the invention:

Fig. 1 is a side elevation, partly in cross-section, of one form of mixer constructed according to the invention;

Fig. 2 is a side elevation, partly in cross-section, of a modified form of the mixer; and Fig. 3 is a side elevation, partly in cross-section, of another modification of the mixer.

The mixer employs a container of non-magnetic material which is here illustrated as a glass pot 10 of a generally conventional type used for making hot beverages. The pot is adapted to be set on an electric heating element 11 mounted on a stand 12.

Mounted in the stand is an electric motor 13 which has suitable connections (not shown) to an alternating or direct current power source. The motor has a drive shaft 14. In Figs. 1 and 2, a disk-shaped permanent magnet 15 is mounted on the shaft. In Fig. 3 an arm 16 is fixed to the shaft and carries a permanent magnet 17 on its outer end.

The pot has a removable cover 19 which may be made of plastic, corrosion resistant metal, or other suitable material. In Fig. 1 a flexible member in the form of a ball chain 20 is attached at its upper end to the cover, for example by embedding the uppermost ball in the material of the cover. Attached to the lower end of the chain is a permanent magnet 21 which is here shown as cubical in shape but may be of any desired shape. The chain and magnet 21 are so proportioned that the magnet is suspended just above the bottom of the pot when the cover is in place. The magnet 21 and magnet 15 or 17, as the case may be, are orientated as indicated, so that, when the pot is set on the heater 11, the motor driven magnet attracts magnet 21 outward toward the position indicated by the dotted line 22. When the motor is running, magnet 21 will follow the north pole of magnet 15. Magnet 21 and chain 20 are thus driven in a circular path and set up a swirling motion in a beverage contained in the pot.

In Fig. 2 a cord 23 is attached at its upper end to an eyelet 24 mounted in cover 19, and at its lower end to an eyelet 25 mounted in magnet 21. This arrangement operates to mix the beverage in the same manner as the ball chain suspension form of the device.

In Fig. 3 a rod 26 carries balls 27 and 28 at either end. The balls are rotatably secured in sockets 29 and 30 mounted on cover 19 and magnet 21, respectively, and form universal joints between the rod and the cover and magnet 21. Magnet 21 will thus swing freely to follow magnet 17 when the latter is driven.

Any of the three forms of mixing devices will operate in conjunction with either the driven disk magnet illustrated in Figs. 1 and 2, or the magnet mounted on a driven arm, as illustrated in Fig. 3. The motor may be driven at high speed so as to produce a rapid mixing action, with considerable aeration, or at slower speed, according to the effect desired for a particular beverage. As the magnet 21 is suspended out of contact with the wall of the container, friction is reduced to a minimum and very little power is required to drive the device.

As there is no mechanical connection between the motor and the mixing device, there is no danger of contamination from the motor.

The cover, along with the suspended magnet 21, can be easily removed from the pot and washed or sterilized in any customary manner. There are no inaccessible parts or connections which could retain spoiled residues of liquid. All parts of the mixing element may be made of materials which will not corrode or react chemically with the beverage. The magnet 21 may, for example, be made of non-corrosive material, or may be sealed in a plastic casing. The magnet 21 remains attached to the cover and thus is not likely to be lost. The device is very convenient to use as there are no parts to be fitted together as in a beater, for example. The user simply sets the cover on the pot after putting in the desired ingredients for the beverage.

What is claimed is:

1. A beverage mixer comprising a container having a top opening, a supporting member overlying said opening, a magnet disposed in said container, means within the container for freely swingably suspending said magnet from the supporting member and magnetic means outside the container for driving said magnet in a substantially circular path.

2. The device as described in claim 1 wherein the means within the container for freely swingably suspending said magnet comprises a flexible member connected to the supporting member on one end and to the magnet on the other end.

3. The device as described in claim 1 wherein the means within the container for freely swingably suspending said magnet comprises a rod connected to the magnet at one end and universally mounted on the supporting member at the other end.

References Cited in the file of this patent

UNITED STATES PATENTS

| | | |
|---|---|---|
| 2,518,758 | Cook | Aug. 15, 1950 |
| 2,528,093 | Somers | Oct. 31, 1950 |
| 2,559,877 | Ihle et al. | July 10, 1951 |
| 2,828,950 | Stilwell | Apr. 1, 1958 |
| 2,837,320 | Baron | June 3, 1958 |

FOREIGN PATENTS

| | | |
|---|---|---|
| 1,026,902 | France | Feb. 11, 1953 |